US012692202B2

(12) United States Patent
Schwöbel et al.

(10) Patent No.: US 12,692,202 B2
(45) Date of Patent: Jul. 28, 2026

(54) METAL-CERAMIC SUBSTRATE, METHOD FOR THE PRODUCTION THEREOF, AND MODULE

(71) Applicant: Heraeus Electronics GmbH & Co. KG, Hanau (DE)

(72) Inventors: Andre Schwöbel, Hanau (DE); Daniel Schnee, Hanau (DE); Leszek Niewolak, Hanau (DE); Miriam Rauer, Hanau (DE); Ruzica Denadic, Hanau (DE)

(73) Assignee: Heraeus Electronics GmbH & Co. KG, Hanau (DE)

( * ) Notice: Subject to any disclaimer, the term of this patent is extended or adjusted under 35 U.S.C. 154(b) by 0 days.

(21) Appl. No.: 18/713,228

(22) PCT Filed: Nov. 1, 2022

(86) PCT No.: PCT/EP2022/080423
§ 371 (c)(1),
(2) Date: May 24, 2024

(87) PCT Pub. No.: WO2023/094120
PCT Pub. Date: Jun. 1, 2023

(65) Prior Publication Data
US 2025/0034050 A1 Jan. 30, 2025

(30) Foreign Application Priority Data

Nov. 26, 2021 (EP) .................................... 21210702

(51) Int. Cl.
C04B 37/02 (2006.01)
B23K 35/30 (2006.01)
C22C 9/02 (2006.01)

(52) U.S. Cl.
CPC .......... *C04B 37/026* (2013.01); *B23K 35/302* (2013.01); *C22C 9/02* (2013.01);
(Continued)

(58) Field of Classification Search
None
See application file for complete search history.

(56) References Cited

U.S. PATENT DOCUMENTS 3,744,120 A 7/1973 Burgess et al.
3,949,118 A 4/1976 Nagano et al.
(Continued)

FOREIGN PATENT DOCUMENTS

CN 113528884 A 10/2021
CN 113825884 A 12/2021
(Continued)

*Primary Examiner* — Xiaobei Wang
(74) *Attorney, Agent, or Firm* — Blank Rome LLP

(57) ABSTRACT

A metal-ceramic substrate which has a highly stable bond between the metal layer and the ceramic body, and also high thermal conductivity and electrical conductivity. The metal-ceramic substrate comprises (a) a ceramic body, (b) a metal layer, and (c) a bonding layer located between the ceramic body and the metal layer. The bonding layer comprises (i) a metal M1 having a melting point of at least 700° C., (ii) a metal M2 having a melting point of less than 700° C., (iii) a metal M3 selected from the group of active metals, and (iv) a metal M4 selected from the group consisting of bismuth, gallium, zinc, indium, germanium, aluminum and magnesium. The bonding layer has the following characteristics: (c1) $M(M2)_{EDX}$=10-20 weight percent, (c2) 15 weight percent$\leq[M(M4)/M(M2)]_{ICP}$*1000 weight percent+ $M(M2)_{EDX}\leq$100 weight percent and (c3) $M(Ag)_{EDX}<$10 weight percent.

16 Claims, 1 Drawing Sheet

(52) U.S. Cl.
      CPC .. *C04B 2237/124* (2013.01); *C04B 2237/343* (2013.01); *C04B 2237/366* (2013.01); *C04B 2237/368* (2013.01); *C04B 2237/407* (2013.01)

(56) References Cited

U.S. PATENT DOCUMENTS

| | | | |
|---|---|---|---|
| 4,603,090 A | 7/1986 | Mizuhara | |
| 5,906,897 A | 5/1999 | Tanaka et al. | |
| 2020/0384579 A1 * | 12/2020 | Britting | B23K 35/0222 |

FOREIGN PATENT DOCUMENTS

| | | | | |
|---|---|---|---|---|
| DE | 2308041 | A1 | 8/1973 | |
| DE | 2457198 | A1 * | 6/1976 | C22C 9/02 |
| DE | 2319854 | C2 | 12/1983 | |
| DE | 102017114893 | A1 | 1/2019 | |
| GB | 1357073 | A | 6/1974 | |
| JP | S5165056 | A | 6/1976 | |
| JP | 4812985 | B2 | 11/2011 | |
| SU | 631288 | A1 | 11/1978 | |

* cited by examiner

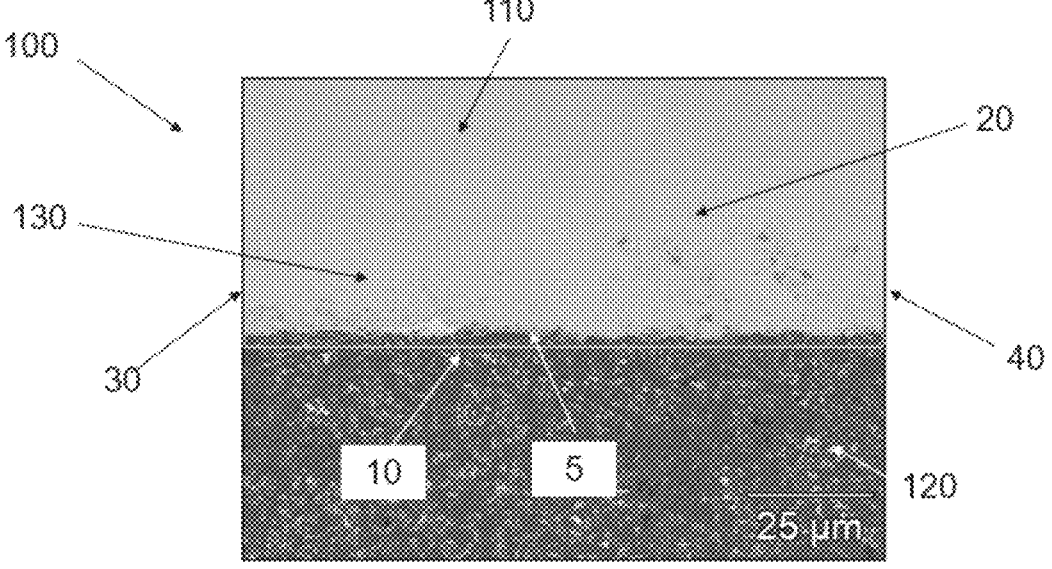

1

METAL-CERAMIC SUBSTRATE, METHOD FOR THE PRODUCTION THEREOF, AND MODULE

FIELD OF THE INVENTION

The present invention relates to a metal-ceramic substrate, a method for producing a metal-ceramic substrate, and a module having a metal-ceramic substrate.

BACKGROUND OF THE DISCLOSURE

Metal-ceramic substrates play an important role in the field of power electronics. They are a crucial element when building electronic components and ensure rapid dissipation of large quantities of heat during operation of said components. Metal-ceramic substrates typically consist of a ceramic layer and a metal layer which is bonded to the ceramic layer.

Several methods are known from the prior art for bonding the metal layer to the ceramic layer. In the so-called DCB ("direct copper bonding") method, a copper foil is provided superficially with a copper compound (usually copper oxide), which has a lower melting point than copper, by reacting copper with a reactive gas (usually oxygen). When the copper foil treated in this way is applied to a ceramic body and the composite is fired, the copper compound melts and wets the surface of the ceramic body, so that a stable cohesive bond is achieved between the copper foil and the ceramic body. This method is described, for example, in U.S. Pat. No. 3,744,120 A or DE 2319854 C2.

Despite obvious advantages, the DCB method has two main disadvantages. Firstly, the method must be carried out at relatively high temperatures, namely somewhat below the melting point of copper. Secondly, the method can only be used for oxide-based ceramics such as aluminum oxide or superficially oxidized aluminum nitride. Therefore, there is a need for an alternative method for producing metal-ceramic substrates under less stringent conditions. In an alternative method, metal foils can be bonded to ceramic bodies at temperatures of approximately 650 to 1000° C., wherein a special solder is used which contains a metal having a melting point of at least 700° C. (usually silver) and an active metal. The role of the active metal is to react with the ceramic material and to thus facilitate a bonding of the ceramic material to the remaining solder, forming a reaction layer, while the metal having a melting point of at least 700° C. serves to bond said reaction layer to the metal foil. For example, JP4812985 B2 proposes bonding a copper foil to a ceramic body using a solder containing 50 to 89 weight percent silver, as well as copper, bismuth and an active metal. With this method, it is possible to stably attach the copper foil to the ceramic body.

In order to avoid problems associated with the migration of silver, it can be advantageous to use silver-free solders for bonding metal foils to ceramic bodies. These solders are based, for example, on high-melting metals (in particular copper), low-melting metals (such as bismuth, indium or tin), and active metals (such as titanium). Such a technique is proposed, for example, in DE 102017114893 A1. This technique basically results in a new, independent class of compounds, since the basis of the solders used is formed by another metal (copper instead of silver), which leads to changed material properties and results in an adaptation with regard to the other solder components and modified joining conditions. The metal-ceramic substrates produced in this way thus comprise, in addition to a metal layer and a ceramic body, a bonding layer between the metal layer and the ceramic body containing an active metal.

The constantly increasing requirements in the field of power electronics have also seen an increase in the requirements for the stability of the bond between the metal layer and the ceramic body in the metal-ceramic substrate and for the thermal conductivity and electrical conductivity of the metal-ceramic substrate. It has been found that the stability of the bond between the metal layer and the ceramic body increases as the content of low-melting metals in the bonding layer increases. However, an increase in the low-melting metal content in the bonding layer results in the problem of increased diffusion of the low-melting metal into the metal layer of the metal-ceramic substrate. This effect leads to the thermal conductivity and electrical conductivity of the metal-ceramic substrate decreasing.

There is, therefore, a need for a metal-ceramic substrate which, on the one hand, comprises a highly stable bond between the metal layer and the ceramic body and, on the other hand, has high thermal conductivity and electrical conductivity. There is also a need for such a metal-ceramic substrate, which is at least largely silver-free, in order to avoid the problems that occur in connection with silver migration.

BRIEF DESCRIPTION OF THE DRAWINGS

FIG. 1 is an electron micrograph image of a metal-ceramic substrate according to the disclosure.

DETAILED DESCRIPTION

The object of the present invention is therefore to provide a metal-ceramic substrate which, on the one hand, comprises a highly stable bond between the metal layer and the ceramic body and, on the other hand, has high thermal conductivity and electrical conductivity. A further object of the present invention is therefore to provide such a metal-ceramic substrate which does not have the problems that occur in connection with a silver migration.

These objects are achieved by the metal-ceramic substrate of claim 1. The invention therefore provides a metal-ceramic substrate comprising
(a) a ceramic body,
(b) a metal layer and
(c) a bonding layer located between the ceramic body and the metal layer, wherein the bonding layer comprises
  (i) a metal M1 having a melting point of at least 700° C.,
  (ii) a metal M2 having a melting point of less than 700° C.,
  (iii) a metal M3 selected from the group of active metals, and
  (iv) a metal M4 selected from the group consisting of bismuth, gallium, zinc, indium, germanium, aluminum and magnesium,
characterized in that the bonding layer has the following features:

$$M(M2)_{EDX} = 10\text{--}20 \text{ weight percent,} \tag{c1}$$

$$15 \text{ weight percent} \le \left[M(M4)/M(M2)\right]_{ICP} * 1000 \text{ weight percent} + \tag{c2}$$

$$M(M2)_{EDX} \le 100 \text{ weight percent, and}$$

-continued $$M(Ag)_{EDX} < 10 \text{ weight percent,} \tag{c3}$$

wherein:

$M(M2)_{EDX}$ is the metal M2 content in the bonding layer, determined by means of EDX;

$[M(M4)/M(M2)]_{ICP}$ is the ratio of the content of metal M4 in the bonding layer to the metal M2 content in the bonding layer, determined by means of ICP, and $M(Ag)_{EDX}$ is the silver content in the bonding layer, determined by means of EDX.

Furthermore, the invention provides a method for producing a metal-ceramic substrate and a module having a metal-ceramic substrate.

The metal-ceramic substrate according to the invention comprises a ceramic body, a metal layer, and a bonding layer.

In the metal-ceramic substrate, the bonding layer is located between the ceramic body and the metal layer. The bonding layer is therefore preferably in contact with the ceramic body and the metal layer. According to a preferred embodiment, the metal-ceramic substrate contains a ceramic body, a (first) metal layer, a (first) bonding layer, which is in contact with the ceramic body and the first metal layer, a second metal layer, and a second bonding layer, which is in contact with the ceramic body and the second metal layer. According to this embodiment, a (first) bonding layer is preferably located between the ceramic body and the (first metal) layer and a second bonding layer is preferably located between the ceramic body and the second metal layer. Furthermore, according to this embodiment, the composition of the first bonding layer preferably corresponds to the composition of the second bonding layer.

The ceramic body preferably comprises a first surface and a second surface. The metal layer preferably comprises a first surface. The second metal layer—if present—preferably comprises a first surface. According to a preferred embodiment, the (first) bonding layer is located in the metal-ceramic substrate between the first surface of the ceramic body and the first surface of the (first) metal layer. According to a further preferred embodiment, the metal-ceramic substrate contains a second bonding layer which is in contact with the second surface of the ceramic body and the first surface of the second metal layer. According to this embodiment, the (first) bonding layer is preferably located in the metal-ceramic substrate between the first surface of the ceramic body and the first surface of the (first) metal layer and the second bonding layer is preferably located between the second surface of the ceramic body and the first surface of the second metal layer. According to a further preferred embodiment, in addition to the bonding layer according to the invention, no further layer is located between the ceramic body and the (first) metal layer. According to yet another embodiment, in addition to the bonding layer according to the invention, no further layer is located between the ceramic body and the second metal layer, if present.

The ceramic of the ceramic body is preferably an insulating ceramic. According to a preferred embodiment, the ceramic is selected from the group consisting of oxide ceramics, nitride ceramics, and carbide ceramics. According to a further preferred embodiment, the ceramic is selected from the group consisting of metal oxide ceramics, silicon oxide ceramics, metal nitride ceramics, silicon nitride ceramics, boron nitride ceramics, and boron carbide ceramics. According to a particularly preferred embodiment, the ceramic is selected from the group consisting of aluminum nitride ceramics, silver nitride ceramics, and aluminum oxide ceramics (such as ZTA ("zirconia toughened alumina") ceramics). According to a further very particularly preferred embodiment, the ceramic body consists of (1) at least one element selected from the group consisting of silicon and aluminum, (2) at least one element selected from the group consisting of oxygen and nitrogen, optionally (3) at least one element selected from the group consisting of (3a) rare earth metals, (3b) metals of the second main group of the periodic table of elements, (3c) zirconium, (3d) copper, (3e) molybdenum and (3f) silicon, and optionally (4) unavoidable impurities. According to yet another very particularly preferred embodiment, the ceramic body is free of bismuth, gallium, and zinc.

The ceramic body preferably has a thickness of 0.05-10 mm, more preferably in the range of 0.1-5 mm, and particularly preferably in the range of 0.15-3 mm.

The metal of the metal layer is preferably selected from the group consisting of copper, aluminum, and molybdenum. According to a particularly preferred embodiment, the metal of the metal layer is selected from the group consisting of copper and molybdenum. According to a very particularly preferred embodiment, the metal of the metal layer is copper. According to a further very particularly preferred embodiment, the metal layer consists of copper and unavoidable impurities.

The metal layer preferably has a thickness in the range of 0.01-10 mm, particularly preferably in the range of 0.03-5 mm, and very particularly preferably in the range of 0.05-3 mm.

The bonding layer comprises (i) a metal M1 having a melting point of at least 700° C., (ii) a metal M2 having a melting point of less than 700° C., (iii) a metal M3 selected from the group of active metals, and (iv) a metal M4 selected from the group consisting of bismuth, gallium, zinc, indium, germanium, aluminum, and magnesium.

A bonding layer is preferably understood to mean the region of the metal-ceramic substrate that is located between the ceramic body and the metal layer.

The bonding layer comprises (i) a metal M1 having a melting point of at least 700° C. The metal M1 having a melting point of at least 700° C. preferably has a melting point of at least 850° C. and particularly preferably a melting point of at least 1000° C. According to a preferred embodiment, the metal M1 having a melting point of at least 700° C. is selected from the group consisting of copper, nickel, tungsten, and molybdenum. According to a particularly preferred embodiment, the metal M1 having a melting point of at least 700° C. is copper.

The bonding layer (ii) comprises a metal M2 having a melting point of less than 700° C. The metal M2 having a melting point of less than 700° C. preferably has a melting point of less than 600° C. and particularly preferably a melting point of less than 550° C. According to a particularly preferred embodiment, the metal M2 having a melting point of less than 700° C. is tin.

The bonding layer comprises (iii) a metal M3 which is selected from the group of active metals. The metal M3 is therefore preferably a metal which produces a bond to the ceramic by a chemical reaction. According to a preferred embodiment, the metal M3 is selected from the group consisting of hafnium, titanium, zirconium, niobium, cerium, tantalum and vanadium. According to a more preferred embodiment, the metal M3 is selected from the group consisting of hafnium, titanium, zirconium, niobium, and cerium. According to a particularly preferred embodiment, the metal M3 is selected from the group consisting of hafnium, titanium and zirconium. According to a very particularly preferred embodiment, the metal M3 is titanium.

The bonding layer comprises (iv) a metal M4. The metal M4 is a metal selected from the group consisting of bismuth, gallium, zinc, indium, germanium, aluminum and magnesium. According to a particularly preferred embodiment, the metal M4 is selected from the group consisting of bismuth, gallium, and zinc. According to a very particularly preferred embodiment, the metal M4 is bismuth.

The metals M1, M2, M3, and M4 are different metals. The bonding layer located between the ceramic body and the metal layer therefore comprises each of the metals M1, M2, M3, and M4. Accordingly, the bonding layer located between the ceramic body and the metal layer comprises (i) a metal M1 having a melting point of at least 700° C., (ii) a metal M2 having a melting point of less than 700° C., (iii) a metal M3 selected from the group of active metals, and (iv) a metal M4 selected from the group consisting of bismuth, gallium, zinc, indium, germanium, aluminum and magnesium, wherein the metals M1, M2, M3 and M4 are different. Therefore, the metal M2 having a melting point of less than 700° C. is not selected from the group consisting of bismuth, gallium, zinc, indium, aluminum and magnesium. Furthermore, the metal M2 is not an active metal. Likewise, the metal M1 having a melting point of at least 700° C. is not germanium. Furthermore, the metal M1 having a melting point of at least 700° C. is not an active metal.

According to the invention, the bonding layer has the following features:

$$M(M2)_{EDX} = 10-20 \text{ weight percent,} \qquad \text{(c1)}$$

$$15 \text{ weight percent} \leq \left[M(M4)/M(M2)\right]_{ICP} * 1000 \text{ weight percent} + \qquad \text{(c2)}$$

$$M(M2)_{EDX} \leq 100 \text{ weight percent, and}$$

$$M(Ag)_{EDX} < 10 \text{ weight percent,} \qquad \text{(c3)}$$

wherein:

$M(M2)_{EDX}$ is the content [in weight percent] of the metal M2 in the bonding layer, determined by means of EDX;

$[M(Bi)/M(M2)]_{ICP}$ is the ratio of the content of metal M4 in the bonding layer to the content of metal M2 in the bonding layer, determined by means of ICP, and $M(Ag)_{EDX}$ is the silver content [in weight percent] in the bonding layer, determined by means of EDX.

According to feature (c1), the content of metal M2 in the bonding layer, determined by means of EDX, is 10-20 weight percent. According to a preferred embodiment, the bonding layer has the following feature:

$$M(M2)_{EDX} = 10-18 \text{ weight percent.} \qquad \text{(c1')}$$

According to a particularly preferred embodiment, the bonding layer has the following feature:

$$M(M2)_{EDX} = 10-15 \text{ weight percent.} \qquad \text{(c1'')}$$

According to feature (c2), there is a relationship between the metal M4 content and the metal M2 content, so that the bonding layer has the following feature:

$$15 \text{ weight percent} \leq \left[M(M4)/M(M2)\right]_{ICP} * 1000 \text{ weight percent} + \qquad \text{(c2)}$$

$$M(M2)_{EDX} \leq 100 \text{ weight percent.}$$

According to a preferred embodiment, the bonding layer has the following feature:

$$15 \text{ weight percent} \leq \left[M(M4)/M(M2)\right]_{ICP} * 1000 \text{ weight percent} + \qquad \text{(c2')}$$

$$M(M2)_{EDX} \leq 80 \text{ weight percent.}$$

According to a particularly preferred embodiment, the bonding layer has the following feature:

$$15 \text{ weight percent} \leq \left[M(M4)/M(M2)\right]_{ICP} * 1000 \text{ weight percent} + \qquad \text{(c2'')}$$

$$M(M2)_{EDX} \leq 70 \text{ weight percent.}$$

Surprisingly, it has been found that the amount of metal M2 having a melting point of less than 700° C. that is required for a particularly stable bond between the ceramic body and the metal layer can already be reduced by the addition of small amounts of metal M4, so that the electrical conductivity and thermal conductivity of the metal-ceramic substrate is not impaired by diffusion of the metal M2 into the metal layer. Furthermore, it has surprisingly been found that a particularly stable bond is achieved if the content of metal M2 in the bonding layer is in a defined region. The relationship between the proportions of the metals M2 and M4 in the bonding layer, which is required for this effect, is expressed by features (c1) and (c2). Therefore, surprisingly, by adjusting the content of the metal M2 having a melting point of less than 700° C. and the content of the metal M4, which is selected from the group consisting of bismuth, gallium, zinc, indium, germanium, aluminum and magnesium, a metal-ceramic substrate is provided that has, on the one hand, a particularly stable bond between the ceramic body and the metal layer and has, on the other hand, high electrical conductivity and thermal conductivity.

According to feature (c3), the content of silver in the bonding layer, determined by means of EDX, is not more than 10 weight percent. Accordingly, the invention also comprises embodiments in which the bonding layer is free of silver, i.e., the content of silver, determined by means of EDX, in the bonding layer is 0 weight percent.

According to a particularly preferred embodiment, the bonding layer has the following feature:

$$M(Ag)_{EDX} < 5 \text{ weight percent,} \qquad \text{(c3')}$$

According to a very particularly preferred embodiment, the bonding layer has the following feature:

$$M(Ag)_{EDX} < 1 \text{ weight percent.} \qquad \text{(c3'')}$$

The absence of silver or the presence of only small amounts of silver means that undesired migration of silver at the edges of the bonding layer in the metal-ceramic substrate can be avoided or reduced.

According to a preferred embodiment, the content of metal M1, determined by means of EDX, in the bonding layer $(M(M1)_{EDX})$ is in the range of 65-89 weight percent. According to a particularly preferred embodiment, the content of metal M1, determined by means of EDX, in the bonding layer $(M(M1)_{EDX})$ is in the range of 67-88 weight percent. According to a very particularly preferred embodiment, the content of metal M1, determined by means of EDX, in the bonding layer $(M(M1)_{EDX})$ is in the range of 70-88 weight percent.

According to a preferred embodiment, the content of metal M3, determined by means of EDX, in the bonding layer $(M(M3)_{EDX})$ is in the range of 0.5-15 weight percent. According to a particularly preferred embodiment, the content of metal M3, determined by means of EDX, in the bonding layer $(M(M3)_{EDX})$ is in the range of 0.5-14 weight percent. According to a very particularly preferred embodiment, the content of metal M3, determined by means of EDX, in the bonding layer $(M(M3)_{EDX})$ is in the range of 1-14 weight percent.

According to a preferred embodiment, the content of metal M4, determined by means of ICP, in the bonding layer $(M(M4)_{ICP})$ is in the range of 0.01-2 weight percent. According to a particularly preferred embodiment, the content of metal M4, determined by means of ICP, in the bonding layer $(M(M4)_{ICP})$ is in the range of 0.01-1.5 weight percent. According to a very particularly preferred embodiment, the content of metal M4, determined by means of ICP, in the bonding layer $(M(M4)_{ICP})$ is in the range of 0.1-1 weight percent.

The metal-ceramic substrate according to the invention can be produced in a manner constituting standard practice in the field.

According to a preferred embodiment, a method for producing a metal-ceramic substrate according to the invention comprises the steps of:
a) providing a stack containing
    a1) a ceramic body,
    a2) a metal foil and
    a3) a solder material that is in contact with the ceramic body and the metal foil,
      wherein the solder material comprises:
      (i) a metal M1 having a melting point of at least 700° C.,
      (ii) a metal M2 having a melting point of less than 700° C.,
      (iii) a metal M3 selected from the group of active metals, and
      (iv) a metal M4 selected from the group consisting of bismuth, gallium, zinc, indium, germanium, aluminum and magnesium, and
b) heating the stack to obtain a metal-ceramic substrate.

Therefore, a stack is preferably first provided which contains a ceramic body, a metal foil and a solder material that is in contact with the ceramic body and the metal foil.

In the stack, the solder material is therefore preferably located between the ceramic body and the metal foil. According to a preferred embodiment, the stack contains a ceramic body, a (first) metal foil, a (first) solder material that is in contact with the ceramic body and the first metal foil, a second metal foil, and a second solder material that is in contact with the ceramic body and the second metal foil. According to this embodiment, a (first) solder material is preferably located between the ceramic body and the (first) metal foil and a second solder material is preferably located between the ceramic body and the second metal foil. Furthermore, according to this embodiment, the first solder material preferably corresponds to the second solder material.

The ceramic body, the metal foil, and the solder material are preferably designed such that the metal-ceramic substrate according to the invention is produced after heating.

Therefore, the ceramic body and the metal foil are preferably designed as described above with respect to the ceramic body and the metal layer of the metal-ceramic substrate.

The solder material preferably comprises (i) a metal M1 having a melting point of at least 700° C., (ii) a metal M2 having a melting point of less than 700° C., (iii) a metal M3 selected from the group of active metals, and (iv) a metal M4 selected from the group consisting of bismuth, gallium, zinc, indium, germanium, aluminum and magnesium. The metal M1, the metal M2, the metal M3 and the metal M4 are preferably designed as described above with respect to the bonding layer of the metal-ceramic substrate.

The metals M1, M2, M3, and M4 are accordingly different metals. The solder material that is in contact with the ceramic body and the metal layer therefore comprises each of the metals M1, M2, M3, and M4. Accordingly, the solder material that is in contact with the ceramic body and the metal layer comprises (i) a metal M1 having a melting point of at least 700° C., (ii) a metal M2 having a melting point of less than 700° C., (iii) a metal M3 selected from the group of active metals, and (iv) a metal M4 selected from the group consisting of bismuth, gallium, zinc, indium, germanium, aluminum and magnesium, wherein the metals M1, M2, M3 and M4 are different. Therefore, the metal M2 having a melting point of less than 700° C. is not selected from the group consisting of bismuth, gallium, zinc, indium, aluminum and magnesium. Furthermore, the metal M2 is not an active metal. Likewise, the metal M1 having a melting point of at least 700° C. is not germanium. Furthermore, the metal M1 having a melting point of at least 700° C. is not an active metal.

According to a preferred embodiment, (i) the metal M1, (ii) the metal M2, (iii) the metal M3, and (iv) the metal M4 are present as a constituent of at least one metal component. The solder material therefore preferably comprises at least one metal component comprising (i) the metal M1, (ii) the metal M2, (iii) the metal M3 and (iv) the metal M4. For example, it can be preferred that the solder material comprises: a metal component (i) containing the metal M1, a metal component (ii) containing the metal M2, a metal component (iii) containing the metal M3, and a metal component (iv) containing the metal M4. Furthermore, it can also be preferred that the solder material comprises: a metal component (i) containing a member from the group consisting of (i) a metal M1, (ii) a metal M2, (iii) a metal M3, and (iv) a metal M4, and at least one further metal component (ii), which comprises members from the group consisting of (i) a metal M1, (ii) a metal M2, (iii) a metal M3, and (iv) a metal M4, which are not contained in metal component (i). The term metal component is not limited further. In addition to metals and metal alloys, it also includes metal compounds, such as intermetallic phases and other compounds (such as metal hydrides, for example). According to a preferred embodiment, the metal component is therefore selected from the group consisting of metals, metal alloys, and metal compounds.

The solder material preferably comprises (i) a metal M1 having a melting point of at least 700° C. According to a preferred embodiment, the solder material comprises a metal component (i) containing a metal M1 having a melting point of at least 700° C. According to a particularly preferred embodiment, the solder material comprises a metal component (i) containing copper. According to a further preferred embodiment, the metal component (i) is copper.

The solder material preferably comprises (ii) a metal M2 having a melting point of less than 700° C. According to a preferred embodiment, the solder material comprises a metal component (ii) containing a metal M2 having a melting point of less than 700° C. According to a particularly preferred embodiment, the metal component (ii) is an alloy of a metal M2 having a melting point of less than 700° C. with a further metal. The further metal can be selected, for example, from the group consisting of metals M1 having a melting point of less than 700° C., metals M2 having a melting point of at least 700° C., metals M3 selected from the group of active metals, and metals M4 selected from the group consisting of bismuth, indium, germanium, gallium, and zinc. According to a further preferred embodiment, the metal component (ii) containing a metal M2 having a melting point of less than 700° C. is selected from the group consisting of tin, tin-copper alloys, tin-bismuth alloys, tin-antimony alloys, tin-zinc-bismuth alloys, and indium-tin alloys.

The solder material preferably comprises a metal M3 selected from the group of active metals. According to a preferred embodiment, the solder material comprises a metal component (iii) containing a metal M3 selected from the group of active metals. According to a particularly preferred embodiment, the metal component (iii) is an active metal alloy or an active metal compound, particularly preferably an active metal hydride. The metal component (iii) is preferably selected from the group consisting of titanium hydride, titanium-zirconium-copper alloys, zirconium hydride and hafnium hydride. According to a particularly preferred embodiment, the metal component (iii) is selected from the group consisting of hafnium hydride, titanium hydride, and zirconium hydride. According to a very particularly preferred embodiment, the metal component (iii) is titanium hydride.

The solder material preferably comprises a metal M4. According to a preferred embodiment, the solder material comprises a metal component (iv) containing a metal M4 selected from the group consisting of bismuth, gallium, zinc, indium, germanium, aluminum and magnesium. According to a particularly preferred embodiment, the solder material comprises a metal component (iv) containing bismuth. According to a further preferred embodiment, the metal component (iv) is bismuth.

According to a preferred embodiment, the proportion of the metal M1 having a melting point of at least 700° C. is 65-89 weight percent, particularly preferably 67-88 weight percent, and very particularly preferably 70-88 weight percent, based on the total metal weight of the solder material. According to a further preferred embodiment, the proportion of the metal M2 having a melting point of less than 700° C. is 10-20 weight percent, particularly preferably 10-18 weight percent, and very particularly preferably 10-15 weight percent, based on the total metal weight of the solder material. According to yet another preferred embodiment, the proportion of the metal M3 selected from the group of active metals is 0.5-15 weight percent, particularly preferably 0.5-14 weight percent, and very particularly preferably 1-14 weight percent, based on the total metal weight of the solder material. According to a further preferred embodiment, the proportion of the metal M4 selected from the group consisting of bismuth, gallium, zinc, indium, germanium, aluminum, and magnesium is 0.01-2 weight percent, particularly preferably 0.01-1.5 weight percent, and very particularly preferably 0.1-1 weight percent, based on the total metal weight of the solder material. The solder material is preferably free of silver or low in silver. Therefore, the proportion of silver is preferably less than 10 weight percent, particularly preferably less than 5 weight percent, and very particularly preferably less than 1 weight percent, based on the total metal weight of the solder material.

The solder material is in contact with the ceramic body and the metal foil. Accordingly, the solder material is preferably located between the ceramic body and the metal foil. For example, the solder material may be provided on the ceramic body and the metal foil may then be applied to the solder material. The solder material is preferably at least one material selected from the group consisting of pastes, foils and deposits comprising a metal M1 having a melting point of at least 700° C., a metal M2 having a melting point of less than 700° C., a metal M3 selected from the group of active metals, and a metal M4 selected from the group consisting of bismuth, gallium, zinc, indium, germanium, aluminum and magnesium.

The solder material can be a paste. The paste preferably comprises (a) at least one metal component comprising a metal M1 having a melting point of at least 700° C., a metal M2 having a melting point of less than 700° C., a metal M3 selected from the group of active metals, and a metal M4 selected from the group consisting of bismuth, gallium, zinc, indium, germanium, aluminum and magnesium, and (b) an organic medium.

The organic medium is preferably an organic medium which is typically used in the relevant technical field. The organic medium preferably contains an organic binder, an organic dispersant or a mixture thereof.

The organic binder is preferably removed from the solder material during heating. The organic binder is preferably thermoplastics or thermosets. Examples of organic binders include cellulose derivatives (such as ethyl cellulose, butyl cellulose, and cellulose acetates), polyethers (such as polyoxymethylene), and acrylic resins (such as polymethyl methacrylates and polybutylene methacrylates).

The organic dispersant is preferably an organic compound which lends the paste a suitable viscosity and which is expelled during drying of the paste or during heating. The organic dispersant can be selected, for example, from aliphatic alcohols, terpene alcohols, alicyclic alcohols, aromatic cyclic carboxylic esters, alicyclic esters, carbitols, and aliphatic polyols. Examples of the organic dispersant comprise octanol, dekanol, terpineols (for example dihydroterpineol), cyclohexanol, dibutyl phthalate, carbitol, ethyl carbitol, ethylene glycol, butanediol and glycerol.

The paste can furthermore contain additives used in standard practice in the field. Examples of such additives include inorganic binders (such as glass frits), stabilizers, surfactants, dispersants, rheology modifiers, wetting aids, defoamers, fillers, and curing agents.

According to a preferred embodiment, the proportion of the at least one metal component comprising a metal M1 having a melting point of at least 700° C., a metal M2 having a melting point of less than 700° C., a metal M3 selected from the group of active metals, and a metal M4 selected from the group consisting of bismuth, gallium, zinc, indium, germanium, aluminum and magnesium is 20-95 weight percent, more preferably 30-95 weight percent, and particularly preferably 75-95 weight percent, in relation to the total weight of the paste. According to a further preferred embodiment, the proportion of the organic medium is 5-80 weight percent, more preferably 5-70 weight percent, and particularly preferably 5-25 weight percent, in relation to the total weight of the paste.

According to a further preferred embodiment, the ratio of the total weight of the (a) at least one metal component comprising a metal M1 having a melting point of at least 700° C., a metal M2 having a melting point of less than 700° C., a metal M3 selected from the group of active metals, and a metal M4 selected from the group consisting of bismuth, gallium, zinc, indium, germanium, aluminum and magnesium, to the weight of the (b) organic medium is at least 5:1, particularly preferably at least 7:1 and very particularly preferably at least 8:1. According to a preferred embodiment, the ratio of the total weight of the (a) at least one metal component comprising a metal M1 having a melting point of at least 700° C., a metal M2 having a melting point of less than 700° C., a metal M3 selected from the group of active metals, and a metal M4 selected from the group consisting of bismuth, gallium, zinc, indium, germanium, aluminum and magnesium to the weight of the (b) organic medium is in the range of 1:1 to 20:1, particularly preferably in the range of 2:1 to 20:1 and particularly preferably in the range of 5:1 to 15:1.

To provide the stack, the paste is preferably applied to the surface of the ceramic body. The paste can be applied, for example, by a dispersion method or a printing method. Suitable printing methods are, for example, screen printing processes, inkjet printing methods, and offset printing processes. Preferably, the paste is applied to the surface of the ceramic body by a screen printing method.

After the paste has been applied, the paste can be pre-dried if necessary. The pre-drying can take place at room temperature or at elevated temperature. The conditions for the pre-drying can vary depending on the organic medium contained in the paste. The pre-drying temperature may, for example, be in the range of 50-180° C. and is preferably in the range of 80-150° C. Pre-drying is usually carried out for a period of 2 min-2 h and preferably for a period of 5 min-1 h.

Subsequently, the metal foil can be applied with its surface to the paste, which is pre-dried if needed, to obtain a stack.

The solder material can be a film.

The film comprises a metal M1 having a melting point of at least 700° C., a metal M2 having a melting point of less than 700° C., a metal M3 selected from the group of active metals, and a metal M4 selected from the group consisting of bismuth, gallium, zinc, indium, germanium, aluminum and magnesium. In addition, the film can comprise further constituents, such as a suitable binder, for example.

The film can be obtained, for example, by at least one metal component comprising a metal M1 having a melting point of at least 700° C., a metal M2 having a melting point of less than 700° C., a metal M3 selected from the group of active metals, and a metal M4 selected from the group consisting of bismuth, gallium, zinc, indium, germanium, aluminum and magnesium, and optionally by further constituents being homogenized and heated to a temperature which is below the melting temperature of the metal M1 having a melting point of at least 700° C., the metal M2 having a melting point of less than 700° C., the active metal M3, and the metal M4 selected from the group consisting of bismuth, gallium, zinc, indium, germanium, aluminum and magnesium, but which is sufficient to form a bond between the metals. This temperature can, for example, be at least 200° C.

Alternatively, the film can be obtained, for example, by mixing at least one metal component comprising a metal M1 having a melting point of at least 700° C., a metal M2 having a melting point of less than 700° C., a metal M3 selected from the group of active metals, and a metal M4 selected from the group consisting of bismuth, gallium, zinc, indium, germanium, aluminum and magnesium, and a binder, and by forming and heating the mixture to form a green body. During heating, the binder can cure and form a matrix in which the metals are distributed.

To provide the stack, the film can, for example, be placed on the ceramic. Subsequently, the surface of the metal foil can be applied to the film located on the ceramic in order to obtain a stack.

According to a further embodiment, the solder material can be a deposit. The deposition of the solder material may be produced, for example, by galvanic deposition or vapor deposition. Preferably, the solder material deposition is produced on the ceramic body. Thereafter, the metal foil can be applied to the solder material deposited on the ceramic in order to obtain a stack.

The stack is heated to obtain a metal-ceramic substrate. According to a preferred embodiment, the heating takes place in order to obtain a metal-ceramic substrate by means of the solder material forming an cohesive bond between the ceramic body and the metal foil. The cohesive bond is preferably formed by the metal M3 being bonded to the ceramic body during heating and the metal M1 having a melting point of at least 700° C., the metal M2 having a melting point of less than 700° C., the metal M4 selected from the group consisting of bismuth, gallium, zinc, indium, germanium, aluminum and magnesium, and the metal of the metal foil being bonded to form an alloy. During the subsequent solidification, a cohesive bond is then formed between the ceramic body and the metal foil via the active metal M3 bonded to the ceramic body and the resulting alloy.

During heating, the stack is heated to a peak temperature. The peak temperature is not limited further and is preferably less than or equal to the melting point of the metal M1 having a melting point of at least 700° C. and lower than the melting point of the metal of the metal foil. According to a preferred embodiment, the peak temperature is at least 10° C. and particularly preferably at least 50° C. below the melting point of the metal of the metal foil. According to a further preferred embodiment, the peak temperature is at least 700° C. The peak temperature is preferably in the range of 700-1100° C., particularly preferably in the range of 750-1050° C., and very particularly preferably in the range of 800-1000° C. The peak temperature used herein refers to the temperature measured at the stack by means of a thermocouple. The peak temperature is the maximum temperature measured at the stack. In order to prevent disadvantageous effects, such as excessive contraction or swelling of the molten metal due to excessive fluidity of the molten metal, the person skilled in the art will endeavor to avoid excessively high peak temperatures.

During heating, the stack is supplied with heat for a high-temperature heating period. The high temperature heating period herein preferably refers to the time period during which the stack is exposed to a temperature at least equal to the peak temperature—250° C. At an exemplary peak temperature of 900° C., the high-temperature heating period therefore corresponds to the time period during which the stack is exposed to at least a temperature of 650° C. during heating. According to a preferred embodiment, the high-temperature heating period is not more than 60 min, more preferably not more than 50 min, particularly preferably not more than 45 min and very particularly preferably not more than 40 min. The high-temperature heating period is preferably in the range of 2-60 min, more preferably in the range of 3-50 min, particularly preferably in the range of 5-45 min, and very particularly preferably in the range of 10-40 min.

The stack is preferably heated by the energy input required for heating taking place in the direction of the stack, starting from a heating zone. The cohesive bond is preferably formed by the metal M3 forming a bond with the ceramic body and the metal M1 having a melting point of at least 700° C., the metal M2 having a melting point of less than 700° C., the metal M4 having a melting point of less than 700° C., the metal M4, which is selected from the group consisting of bismuth, gallium, zinc, indium, germanium, aluminum and magnesium, and the metal of the metal foil being bonded to form an alloy. During the subsequent solidification, a cohesive bond is then formed between the ceramic body and the metal foil via the active metal M3 bonded to the ceramic body and the alloy.

According to a particularly preferred embodiment, the stack is heated in an oven, preferably in a continuous furnace or in a chamber furnace.

A non-oxidizing atmosphere is preferably present in the heating zone. The non-oxidizing atmosphere is preferably an inert gas atmosphere. A nitrogen atmosphere, a helium atmosphere, or an argon atmosphere is preferably present in the heating zone. According to a particularly preferred embodiment, a nitrogen atmosphere is present in the heating zone. The proportion of a reactive gas, in particular oxygen, in the non-oxidizing atmosphere is preferably less than 1000 ppm, more preferably less than 500 ppm, and particularly preferably less than 40 ppm.

When the stack is being heated, a cohesive bond is preferably formed between the ceramic body and the metal foil via the solder material to obtain a metal-ceramic substrate comprising a ceramic body, a metal layer, and a bonding layer located between the ceramic body and the metal layer. If necessary, the metal-ceramic substrate can be subjected to further treatment steps. For example, the metal-ceramic substrate, preferably the exposed surface of the metal layer of the metal-ceramic substrate, can be polished. Preferably, the surface of the metal layer of the metal-ceramic substrate is physically or chemically polished. Furthermore, the metal-ceramic substrate can be structured. For example, the metal-ceramic substrate can be provided with conductor traces. The conductor traces are preferably produced by etching.

The metal-ceramic substrate according to the invention can in particular be used for applications in electronics, especially for the field of power electronics.

The invention therefore also provides a module which has a metal-ceramic substrate described above.

According to a preferred embodiment, such a module comprises a base plate. Said base plate is preferably extensively bonded to the metal layer of the metal-ceramic substrate. According to a further preferred embodiment, the module comprises at least one chip. The at least one chip is preferably extensively bonded to the metal layer of the at least one metal-ceramic substrate. According to a further preferred embodiment, the module comprises a metal-ceramic substrate comprising a first metal layer and a second metal layer (wherein the first metal layer is preferably opposite the second metal layer), a base plate, and at least one chip, wherein the at least one chip is bonded to the first metal layer of the metal-ceramic substrate and the base plate is bonded to the second metal layer of the metal-ceramic substrate.

The features of the bonding layer of the metal-ceramic substrate are preferably determined using the measurement methods described below:

Measurement Methods:

(i) Method for determining the content of the metals M1, M2, M3, and silver in the bonding layer (features $M(M1)_{EDX}$, $M(M2)_{EDX}$, $M(M3)_{EDX}$ and $M(Ag)_{EDX}$):

The content of the metals M1, M2, M3 and silver in the bonding layer is preferably determined as follows:

In a first step, a cuboid sample blank having a rectangular base in the range of 100 mm² to 400 mm² is first cut out of the metal-ceramic substrate to be examined by sawing using a diamond saw blade at a low rotational speed and using an oil-based lubricant (Buehler) perpendicular to a plane spanned by the metal layer of the metal-ceramic substrate. The sample blank accordingly has a sample surface which is supplied to the investigation. This sample surface therefore runs perpendicular to the plane spanned by the metal layer of the metal-ceramic substrate before sawing. It therefore has portions on the ceramic body, the metal layer, and the bonding layer therebetween. The sample blank is first embedded in a casting mold with a low-shrinkage epoxy resin (Epo-Fix, Struers), wherein the sample surface is oriented perpendicular to the mold wall. The epoxy resin is then cured at room temperature. After curing, the sample surface of the sample blank is mechanically polished with an automated polishing device (Tegrapole, Struers) in order to achieve a roughness of 1 μm or less.

In a second step, the polished sample surface is conductively coated with iridium in a thickness of 1-5 nm by means of a metal sputtering device (Q150T, Quorum Technologies).

In a third step, an analysis zone on the sample surface is examined by means of scanning electron microscopy energy dispersive X-ray spectroscopy (SEM-EDX). In SEM-EDX, a focused primary electron beam is guided (screened) over the sample surface point by point. The scattered electrons are detected using a detector, wherein the number of electrons per pixel results in a microscopic image of the sample surface in grayscale. In addition, the primary electron beam excites the sample to emit characteristic X-ray radiation, wherein the elements in the sample and their weight proportion can be determined by analyzing the energy spectrum using an EDX detector. For the examination, a scanning electron microscope (JSM-6060 SEM, JEOL Ltd) with a silicon drift EDX detector (NORAN, Thermo Scientific Inc) and analytical software (Pathfinder Mountaineer EDS System, for example Version 2.8, Thermo Scientific Inc), are used. For scanning electron microscopy, the following settings are used: magnification: 1000-fold, acceleration voltage=15 kV, working distance=10 mm, spot size (50-60) (set to reach 25%+/−5% of the dead time of the EDX detector).

In a fourth step, the sample surface is detected using the EDX software as electron micrograph (backscattered electron micrograph). A rectangular field of view of at least 125 μm (horizontal)×90 μm (vertical) is obtained, wherein the analysis zone is defined using the point analysis function of the EDX software. The analysis zone can be described as follows with reference to FIG. 1:

a) The sample surface is oriented such that in the electron micrograph 100 the cutout of the ceramic body 120 is at the bottom and the cutout of the metal layer 110 is at the top. In the electron micrograph 100, a transition 5 is visible between the ceramic body (dark) 120 and the bonding layer or metal layer (light) 110. The lower boundary line 10 of the rectangle of the analysis zone 130 is described by a line parallel to said transition 5, which line extends directly at this transition 5 exclusively through the ceramic body 120.

b) In this orientation, the sample surface is examined for the presence of a metal M2 having a melting point of less than 700° C. and the presence of an active metal M3. The grayscale image of the electron micrograph 100 within the bonding layer or metal layer 110 is investigated, wherein the metal M2 has the brightest pixel and the metal M3 has the darkest pixel (with exclusion of the ceramic body). A line in the electron micrograph 100 parallel to the lower boundary line 10 of the rectangle of the analysis zone 130, which line runs through the furthest point at which either metal M2 having a melting point of less than 700° C. or metal M3 is detected, forms the upper boundary line 20 of the rectangle of the analysis zone 130.

c) The left boundary line 30 and the right boundary line 40 of the rectangle of the analysis zone 130 run parallel to one another at a distance corresponding to a distance of the boundary lines of the field of view (preferably 125 μm) on the sample surface, and perpendicular to the lower boundary line 10 and the upper boundary line 20.

In a fifth step, the EDX spectrum is detected using the following settings of the EDX detector: live time=30 s, rate=auto, low energy cutoff=100 keV, high energy cutoff=auto (per SEM acceleration voltage).

In a sixth step, the spectrum is analyzed. For this purpose, the elements to be examined are selected and the elements contained in the ceramic body (the presence thereof can optionally be determined beforehand by a conventional test method), iridium and elements of the epoxy resin are deselected. The quantity of each of the elements to be examined is indicated in weight percent, wherein the total amount corresponds to 100%.

The third to sixth steps are repeated nine times at different points. The mean value is then determined from the values obtained from the total ten individual measurements.

(ii) A method for determining the ratio of the content of element M4 in the bonding layer to the content of metal M2 in the bonding layer (feature $[M(M4)/M(M2)]_{ICP}$:

The ratio $[M(M4)/M(M2)]_{ICP}$ in the bonding layer of the metal-ceramic substrate is preferably determined as follows:

The metal-ceramic substrate to be examined is transferred into a plastic beaker made of HDPE (high-density polyethylene), and admixed with hydrochloric acid (concentration=30%) and nitric acid (concentration=65%) with low heat supply. Hydrofluoric acid (concentration=40%) is added to the digestion to dissolve any further insoluble components. For conventionally dimensioned metal-ceramic substrates, the following amounts of acid have been found to be advantageous: 30 ml hydrochloric acid (concentrate=30%), 20 ml nitric acid (concentration=65%) and 50 μl hydrofluoric acid (concentration=40%).

The sample solution thus obtained is transferred into a tared polyethylene bottle. The sample solution is then diluted with water in accordance with an expected value in relation to the content of the element to be examined. An aliquot of the sample solution is transferred into a 100 ml measuring flask, in which 10 ml hydrochloric acid (30 weight percent) and 10 ml buffered saline (10 g/l sodium chloride) and a calibration standard (for example a 1 g/l yttrium solution) were provided. The measurement solution thus obtained is measured with regard to the ratio $[M(M4)/M (M2)]_{ICP}$ against the calibration standard using ICP-OES (inductively coupled plasma–optical emission spectrometry). For this purpose, the ICP emission spectrometer iCAP 6500 Duo (Thermo Scientific Inc) is used, wherein the following plasma settings are configured for the measurement: purge pump rate (rpm): 35; analytical pump rate (rpm): 35; pump tube type: Tygon Orange/white; HF power: 1150 W; atomizer gas: 0.60 l/min; auxiliary gas: 0.5 l/min.

The present invention is illustrated by the exemplary embodiments below, which are not to be understood as limiting.

Exemplary Embodiments:

Production of Metal-Ceramic Substrates (Examples 1-8 and Comparative Examples 1-7):

In Examples 1-8 and Comparative Examples 1-7, metal-ceramic substrates, which differ in terms of the composition of the bonding layer, were produced. A stack containing a ceramic body, a metal foil, and a solder material, which is in contact with the ceramic body and the metal foil, was thereby provided in each case and then heated. The metal-ceramic substrates thus obtained were then tested with regard to their bond strength and their thermal conductivity and electrical conductivity.

For the production of the metal-ceramic substrates 1-8 according to the invention and for the Comparative Examples 1-7, pastes according to the compositions indicated in Table 1 were first prepared.

TABLE 1

| Content in weight percent | Cu | Sn | TiH$_2$ | Bi | Organic medium |
|---|---|---|---|---|---|
| | | Examples | | | |
| 1 | 68.72 | 18.35 | 3.62 | 0.05 | 9.25 |
| 2 | 64.22 | 22.67 | 3.62 | 0.05 | 9.43 |
| 3 | 73.20 | 13.60 | 3.62 | 0.10 | 9.48 |
| 4 | 73.12 | 13.50 | 3.62 | 0.16 | 9.60 |
| 5 | 71.06 | 15.50 | 3.62 | 0.31 | 9.51 |
| 6 | 74.89 | 11.27 | 3.62 | 0.41 | 9.81 |
| 7 | 72.57 | 13.77 | 3.62 | 0.47 | 9.57 |
| 8 | 67.50 | 18.10 | 3.62 | 0.79 | 10.00 |
| | Comparative examples | | | | |
| V1 | 71.59 | 15.29 | 3.62 | 0.00 | 9.49 |
| V2 | 73.31 | 13.60 | 3.62 | 0.03 | 9.45 |
| V3 | 82.35 | 4.83 | 3.62 | 0.05 | 9.14 |
| V4 | 79.95 | 6.78 | 3.62 | 0.17 | 9.48 |
| V5 | 79.47 | 6.86 | 3.62 | 0.41 | 9.64 |
| V6 | 81.58 | 5.06 | 3.62 | 0.52 | 9.22 |
| V7 | 51.81 | 31.45 | 7.24 | 0.00 | 9.50 |

For this purpose, tin, titanium hydride, and bismuth were introduced as powders in succession in the stated amounts into the indicated amount of the organic vehicle containing texanol and mixed at 35 Hz for 20 minutes in a stationary mixing device until a homogeneous paste was obtained in each case. Thereafter, the copper powder was added in increments. The mixture thus produced was stirred until a homogeneous paste was obtained.

With the pastes produced in this way, ceramic bodies were bonded on their opposite surfaces on both sides to copper foils. For this purpose, ceramic bodies having the dimensions 177.8×139.7×0.32 mm (obtained from Toshiba Materials) were used, which had an identical front and rear-side provision. The respective paste was screen printed using a 165 mesh screen on a region of the dimension 137×175 mm² onto the rear side of such a ceramic body and pre-dried at 125° C. for 15 minutes. The paste thickness after the pre-drying was 35+/−5 μm. The arrangement thus produced was then rotated, the paste was printed and pre-dried uniformly onto the front side of the ceramic body. Subsequently, the ceramic provided with paste on both sides was provided on both sides with copper foil made of oxygen-free, highly conductive copper having a purity of 99.99% and a dimension of 174×137×0.3 mm in order to obtain a stack having the following structure: copper foil-pre-dried paste-ceramics-pre-dried paste-copper foil.

The stack was then heated in a continuous furnace. For this purpose, a silicon carbide plate, onto which a graphite foil was applied, was first placed on the transport chain of a continuous furnace. The stack was placed on the graphite foil and then covered with a further graphite foil and weighed with a further silicon carbide plate (weight=600 g). The structure was then transported on the transport chain through the heating zone of a continuous furnace and heated within 25 min starting from 50° C. to a peak temperature of 935° C. (measured at the stack using a type K thermocouple from Temperatur Messelemente Hettstedt GmbH) for 2 min. The temperature of the structure was then cooled to 50° C. again within 25 min.

The metal-ceramic substrates thus obtained were then cooled to room temperature in order to obtain metal-ceramic substrates which each contained a ceramic layer bonded to a copper layer on both sides via a bonding layer.

Evaluation:

The values according to Table 2 were determined for the metal-ceramic substrates of Examples 1-8 and Comparative Examples 1-7:

TABLE 2

| Value | Feature | Explanation |
|---|---|---|
| (c1) | $M(M2)_{EDX}$ | Content [in weight percent] of tin (metal M2) in the bonding layer, determined by means of EDX. |
| (c2) | $[M(M4)/M(M2)]_{ICP} * 1000$ weight percent + $(M2)_{EDX}$ | $[M(M4)/M(M2)]_{ICP}$: the ratio of bismuth (metal M4) in the bonding layer to tin (metal M2) in the bonding layer, determined by means of ICP. $M(M2)_{EDX}$: content [in weight percent] of tin (metal M2) in the bonding layer, determined by means of EDX. |
| (c3) | $M(Ag)_{EDX}$ | Content [in weight percent] of silver in the bonding layer determined by means of EDX. |

Furthermore, on the metal-ceramic substrates of Examples 1-8 and Comparative Examples 1-7 the bond strength was determined by means of the peel strength test and the electrical conductivity and thermal conductivity were determined.

The results are listed in Table 3.

TABLE 3

| | (c1) | (c2) | (c3) | Adhesive strength | Conductivity |
|---|---|---|---|---|---|
| | | | Examples | | |
| 1 | 13.0 | 15.9 | 0.0 | + | High |
| 2 | 13.9 | 16.2 | 0.0 | + | High |
| 3 | 11.4 | 19.1 | 0.0 | + | High |
| 4 | 11.4 | 23.0 | 0.0 | ++ | High |
| 5 | 12.5 | 32.7 | 0.0 | +++ | High |
| 6 | 10.4 | 46.4 | 0.0 | +++ | High |
| 7 | 11.1 | 45.2 | 0.0 | ++ | High |
| 8 | 13.0 | 56.6 | 0.0 | +++ | High |
| | | | Comparative examples | | |
| 1 | 12.0 | 12.0 | 0.0 | − | High |
| 2 | 11.4 | 13.5 | 0.0 | − | High |
| 3 | 5.3 | 16.1 | 0.0 | − | High |

TABLE 3-continued

| | (c1) | (c2) | (c3) | Adhesive strength | Conductivity |
|---|---|---|---|---|---|
| 4 | 7.6 | 32.4 | 0.0 | − | High |
| 5 | 7.6 | 66.9 | 0.0 | − | High |
| 6 | 5.9 | 109.1 | 0.0 | − | High |
| 7 | 21.8 | 21.8 | 0.0 | ++ | Low |

Legend:

+++: Adhesive strength in the peel strength test > 100 N/cm.

++: Adhesive strength in the peel strength test = 75 < 100 N/cm.

+: Adhesive strength in the peel strength test = 40 < 75 N/cm.

−: Adhesive strength in the peel strength test < 40 N/cm.

The exemplary embodiments show that metal-ceramic substrates that meet the conditions:

$$M(M2)_{EDX} = 10\text{--}20 \text{ weight percent,} \tag{c1}$$

$$15 \text{ weight percent} \le [M(M4)/M(M2)]_{ICP} * 1000 \text{ weight percent} + \tag{c2}$$
$$M(M2)_{EDX} \le 100 \text{ weight percent, and}$$

$$M(Ag)_{EDX} = 0\text{--}10 \text{ weight percent} \tag{c3}$$

with respect to the bonding layer, have a stable bond between the metal layer and the ceramic body with simultaneously high thermal conductivity and electrical conductivity. Since these metal-ceramic substrates are free of silver, there are also no problems in connection with silver migration. In the case of metal-ceramic substrates which do not meet the conditions (c1) and (c2), a less stable bonding of the metal layer to the ceramic body results in comparison thereto or the obtained metal-ceramic substrates have a low thermal conductivity and electrical conductivity in comparison thereto.

Preparation of Metal-Ceramic Substrates (Examples 9 and 10 and Comparative Example 8)

In Examples 9 and 10 and Comparative Example 8, metal-ceramic substrates were produced analogously to Examples 1-8 and Comparative Examples 1-7, but with a different composition of the bonding layer, and are then validated with regard to their bond strength and their thermal conductivity and electrical conductivity.

Pastes according to the compositions indicated in Table 4 were used for the production of the metal-ceramic substrates.

TABLE 4

| Content in weight percent | Cu | Sb | Sn | TiH$_2$ | Zr | Bi | Ge | Organic medium |
|---|---|---|---|---|---|---|---|---|
| | | | | Examples | | | | |
| 9 | 70.58 | — | 15.30 | 3.62 | — | — | 1.00 | 9.50 |
| 10 | 65.00 | — | 18.40 | 3.25 | 3.25 | 0.50 | — | 9.60 |
| | | | | Comparative example | | | | |
| 8 | 69.58 | 2.00 | 15.3 | 3.62 | — | — | — | 9.50 |

Evaluation:

For the metal-ceramic substrates of Examples 9 and 10 and comparative example 8, the values according to Table 2 were determined. Furthermore, the bond strength on the metal-ceramic substrates of Examples 9 and 10 and Comparative Example 8 was determined by means of the peel strength test and the electrical conductivity and thermal conductivity were determined.

The results are shown in Table 5.

TABLE 5

| | (c1) | (c2) | (c3) | Adhesive strength | Conductivity |
|---|---|---|---|---|---|
| | | | Examples | | |
| 9 | 11.55 | 77.0 | 0.0 | ++ | High |
| 10 | 12.52 | 39.6 | 0.0 | ++ | High |
| | | | Comparative example | | |
| 8 | 11.48 | 11.48 | 0 | – | High |

Legend:
+++: Adhesive strength in the peel strength test > 100 N/cm.
++: Adhesive Strength in the peel strength test = 75 < 100 N/cm.
+: Adhesive strength in the peel strength test = 40 < 75 N/cm.
–: Adhesive strength in the peel strength test < 40 N/cm.

Legend:

Exemplary embodiments 9 and 10 confirm that metal-ceramic substrates that meet the conditions:

$$M(M2)_{EDX} = 10\text{--}20 \text{ weight percent,} \quad \text{(c1)}$$

$$15 \text{ weight percent} \leq \left[M(M4)/M(M2)\right]_{ICP} * 1000 \text{ weight percent} + \quad \text{(c2)}$$

$$M(M2)_{EDX} \leq 100 \text{ weight percent, and}$$

$$M(Ag)_{EDX} = 0\text{--}10 \text{ weight percent} \quad \text{(c3)}$$

with respect to the bonding layer, have a stable bond between the metal layer and the ceramic body with simultaneously high thermal conductivity and electrical conductivity. Since these metal-ceramic substrates are free of silver, there are also no problems in connection with silver migration. In the case of metal-ceramic substrates which do not meet the conditions (c1) and (c2), a less stable bonding of the metal layer to the ceramic body results in comparison thereto or the obtained metal-ceramic substrates have a low thermal conductivity and electrical conductivity in comparison thereto.

The invention claimed is:

1. A metal-ceramic substrate comprising:
(a) a ceramic body;
(b) a metal layer; and
(c) a bonding layer located between the ceramic body and the metal layer, the bonding layer comprising:

(i) a metal M1, the metal M1 being copper;
(ii) a metal M2, the metal M2 being tin;
(iii) a metal M3 selected from the group consisting of hafnium, titanium, zirconium, niobium, tantalum, vanadium and cerium; and
(iv) a metal M4 selected from the group consisting of bismuth, gallium, zinc, indium, germanium, aluminum and magnesium,
wherein the bonding layer has the following features:

$$M(M2)_{EDX} = 10\text{--}20 \text{ weight percent,} \quad \text{(c1)}$$

$$15 \text{ weight percent} \leq \left[M(M4)/M(M2)\right]_{ICP} * 1000 \text{ weight percent} + \quad \text{(c2)}$$

$$M(M2)_{EDX} \leq 100 \text{ weight percent, and}$$

$$M(Ag)_{EDX} = <10 \text{ weight percent, and} \quad \text{(c3)}$$

wherein:
M(M2)$_{EDX}$ is the content, in weight percent, of the metal M2 in the bonding layer, determined by means of Energy Dispersive X-Ray (EDX),
[M(M4)/M(M2)]$_{ICP}$ is the ratio of the content of metal M4 in the bonding layer to the content of metal M2 in the bonding layer, determined by means of Inductively Coupled Plasma (ICP),
M(Ag)$_{EDX}$ is the silver content, in weight percent, in the bonding layer, determined by means of EDX, and
the bonding layer exhibits an adhesive strength of at least 40 N/cm.

2. The metal-ceramic substrate according to claim 1, wherein the ceramic of the ceramic body is selected from the group consisting of aluminum nitride ceramics, silicon nitride ceramics, and aluminum oxide ceramics.

3. The metal-ceramic substrate according to claim 1, wherein the metal of the metal layer is copper.

4. The metal-ceramic substrate according to claim 1, wherein the metal M4 is bismuth.

5. The metal-ceramic substrate according to claim 1, wherein the bonding layer has the following feature:

$$M(M2)_{EDX} = 10\text{--}15 \text{ weight percent.} \quad \text{(c1')}$$

6. The metal-ceramic substrate according to claim 1, wherein the bonding layer has the following feature:

$$15 \text{ weight percent} \leq \left[M(M4)/M(M2)\right]_{ICP} * 1000 \text{ weight percent} + \quad \text{(c2')}$$

$$M(M2)_{EDX} \leq 70 \text{ weight percent.}$$

7. The metal-ceramic substrate according to claim 1, wherein the bonding layer has the following feature:

$$M(Ag)_{EDX} < 1 \text{ weight percent.} \quad \text{(c3')}$$

8. A method for producing the metal-ceramic substrate of claim 1 comprising the steps of:
a) providing a stack containing
a1) a ceramic body
a2) a metal foil and
a3) a solder material that is in contact with the ceramic body and the metal foil, wherein the solder material comprises:

(i) the metal M1, (ii) the metal M2, (iii) the metal M3, and (iv) the metal M4, and b) heating the stack to obtain the metal-ceramic substrate.

9. A module comprising the metal-ceramic substrate according to claim 1.

10. The metal-ceramic substrate of claim 1, wherein the bonding layer is free of silver.

11. The metal-ceramic substrate of claim 1, wherein
the metal M3 is titanium; and
the metal M4 is bismuth.

12. The metal-ceramic substrate of claim 1, wherein
the metal M3 is a combination of titanium and zirconium;
    and
the metal M4 is bismuth.

13. The metal-ceramic substrate of claim 1, wherein
the metal M3 is titanium; and
the metal M4 is germanium.

14. The metal-ceramic substrate of claim 1, wherein the bonding layer exhibits an adhesive strength of at least 75 N/cm.

15. The metal-ceramic substrate of claim 4, wherein the bonding layer exhibits an adhesive strength of at least 75 N/cm.

16. The metal-ceramic substrate of claim 1, wherein the bonding layer exhibits an adhesive strength of greater than 100 N/cm.

\* \* \* \* \*